(12) United States Patent
Hakenholt et al.

(10) Patent No.: US 10,823,219 B2
(45) Date of Patent: Nov. 3, 2020

(54) THREAD-FORMING SCREW WITH SEPARATE THREAD SPRIAL AND DIFFERENT PART FLANK ANGLES

(71) Applicant: Hilti Aktiengesellschaft, Schaan (LI)

(72) Inventors: Christoph Hakenholt, Feldkirch (AT); Bernhard Winkler, Feldkirch (AT); Roland Schneider, Schlins (AT); Robert Spring, Fruemsen (CH); Huu Toan Nguyen, Eichberg (CH)

(73) Assignee: Hilti Aktiengesellschaft, Schaan (LI)

( * ) Notice: Subject to any disclaimer, the term of this patent is extended or adjusted under 35 U.S.C. 154(b) by 285 days.

(21) Appl. No.: 15/765,888

(22) PCT Filed: Oct. 4, 2016

(86) PCT No.: PCT/EP2016/073628
§ 371 (c)(1),
(2) Date: Apr. 4, 2018

(87) PCT Pub. No.: WO2017/060214
PCT Pub. Date: Apr. 13, 2017

(65) Prior Publication Data
US 2018/0283435 A1    Oct. 4, 2018

(30) Foreign Application Priority Data
Oct. 6, 2015    (EP) .................................... 15188544

(51) Int. Cl.
*F16B 25/00* (2006.01)
*F16B 37/12* (2006.01)

(52) U.S. Cl.
CPC ...... *F16B 25/0094* (2013.01); *F16B 25/0026* (2013.01); *F16B 25/0042* (2013.01);
(Continued)

(58) Field of Classification Search
CPC .............. F16B 25/0026; F16B 25/0042; F16B 25/0052; F16B 25/0084; F16B 25/0094;
(Continued)

(56) References Cited

U.S. PATENT DOCUMENTS 240,780 A * 4/1881 Smith .................... B25B 1/103
74/458
782,349 A * 2/1905 Marshall ................ F16B 37/12
411/262
(Continued)

FOREIGN PATENT DOCUMENTS

CN      104235162 A     12/2014
DE      28 23 897 A1    2/1979
(Continued)

OTHER PUBLICATIONS

PCT/EP2016/073628, International Search Report (PCT/ISA/220 and PCT/ISA/210) dated Dec. 16, 2016, with partial English translation, enclosing Written Opinion of the International Searching Authority (PCT/ISA/237) (Twelve (12) pages).

*Primary Examiner* — Roberta S Delisle
(74) *Attorney, Agent, or Firm* — Crowell & Moring LLP

(57) ABSTRACT

A thread-forming screw has a shank which, in a front region of the shank, has a tip for insertion into a bore in a substrate, and in a rear region of the shank, has a drive for transmitting a torque to the shank. The shank has a spiral-shaped groove and a thread spiral which is inserted into the spiral-shaped groove. The spiral-shaped groove has a front flank and a rear flank disposed opposite the front flank. The front flank, at least regionally, has a different part flank angle than the rear flank.

6 Claims, 2 Drawing Sheets

(52) U.S. Cl.
CPC .......... *F16B 25/0084* (2013.01); *F16B 25/00* (2013.01); *F16B 37/12* (2013.01)

(58) Field of Classification Search
CPC ........ F16B 33/02; F16B 35/041; F16B 37/12; F16B 25/00
USPC .................................................. 411/411, 424
See application file for complete search history.

(56) References Cited

U.S. PATENT DOCUMENTS

| | | | |
|---|---|---|---|
| 1,181,971 | A | 5/1916 | Lovell |
| 2,262,450 | A * | 11/1941 | Camines ................. F16B 37/12 411/282 |
| 2,520,232 | A * | 8/1950 | Bohdan Bereza ...... F16B 37/12 411/423 |
| 4,106,540 | A | 8/1978 | Myers |
| 8,430,617 | B2 | 4/2013 | Hettich et al. |
| 8,747,042 | B2 * | 6/2014 | Hagel ..................... F16B 25/00 411/383 |
| 8,920,093 | B2 | 12/2014 | Hettich |
| 9,790,979 | B2 | 10/2017 | Torii et al. |
| 2004/0258502 | A1 | 12/2004 | Unsworth et al. |
| 2011/0142569 | A1 | 6/2011 | Hagel et al. |
| 2013/0276287 | A1 * | 10/2013 | Thommes ................ B21F 3/02 29/428 |

FOREIGN PATENT DOCUMENTS

| | | |
|---|---|---|
| DE | 87 13 708 U1 | 11/1987 |
| DE | 10 2007 042 977 A1 | 4/2009 |
| DE | 10 2008 016 866 B4 | 10/2009 |
| DE | 10 2010 063 682 A1 | 6/2012 |
| EP | 0 905 389 A2 | 3/1999 |
| EP | 1 498 618 A2 | 1/2005 |
| EP | 2 185 829 B1 | 5/2010 |
| EP | 2 390 516 A1 | 11/2011 |
| JP | 8-177839 A | 7/1996 |
| RU | 2 523 712 C1 | 7/2014 |

* cited by examiner

THREAD-FORMING SCREW WITH SEPARATE THREAD SPRIAL AND DIFFERENT PART FLANK ANGLES

This application claims the priority of International Application No. PCT/EP2016/073628, filed Oct. 4, 2016, and European Patent Document No. 15188544.9, filed Oct. 6, 2015, the disclosures of which are expressly incorporated by reference.

BACKGROUND AND SUMMARY OF THE INVENTION

The invention relates to a thread-forming, in particular, thread-cutting, screw. Such a screw is equipped with a shank, which, in a front region of the shank, has a tip for insertion into a bore in a substrate; in a rear region of the shank, has a drive for transmitting a torque to the shank; and has a spiral-shaped groove; and is equipped with a thread spiral, which is inserted into the spiral-shaped groove, the spiral-shaped groove having a front flank and a rear flank situated opposite the front flank.

A concrete screw with two thread sections emerges from US 20110142569 A1. A first, rear thread section is integrally formed with the shank and a second, front thread section is formed by a thread spiral which is arranged in a spiral-shaped groove in the shank. The two thread sections form a single connected thread.

DE 102010063682 A1 shows a concrete screw with a shank with a thread and with a cutting spring which is screwed into the thread on the shank, at least in regions. The cutting spring can, for example, have a drop-shaped cross-section.

DE 102007042977 A1, EP 2185829 B1 and EP 2390516 A1 disclose screw anchors for fastening attachment parts in concrete or masonry with one shank, which has an outer thread which is formed by a thread spiral separated from the shank, the thread spiral being fastened on the shank in different manners.

DE 102008016866 B4 describes a screw comprising a shank part made of full material and a thread part connected and attached to the shank part and wound from a profiled metal strip.

EP 1498618 A2 proposes a screw whose shank with a rolled-on thread consists of a corrosion-resistant metal. A recess located in the thread line is milled in the region of the front end of the screw shank; an insert made of hardened metal is inserted into the recess. This insert has a cutting formation containing a plurality of saw teeth located in the thread line.

Further fastening elements with separate spiral arrangements emerge from U.S. Pat. No. 1,181,971 A, DE 87 13 708 U1 and US 20040258502 A1.

EP 0905389 A2 discloses a concrete screw, in which there is a screw section made of hardened steel located at the front in the screw-in direction and a screw section made of stainless steel located at the rear when viewed in the screw-in direction.

The object of the invention is to indicate a thread-forming screw that is easy to manufacture with a thread spiral that is separated from the shank, which can be used in a particularly versatile manner, is particularly reliable and has particularly good load values.

A screw according to the invention is characterized in that the front flank of the spiral-shaped groove has a different part flank angle, at least in regions, than the rear flank of the spiral-shaped groove.

A fundamental concept of the invention may be considered implementing the spiral-shaped groove, which is provided to receive the thread spiral separated from the shank, in the cut. The two opposing flanks of the spiral-shaped groove are in particular arranged at different part flank angles. The part flank angle can, as is customary in the specialist field, be understood as the angle between the respective flank and the vertical to the thread axis in the axial section. The invention has acknowledged that the flanks of the spiral-shaped groove or of the thread spiral can form a wedge gear in a generic screw with separate thread spiral which can convert an axial load in the shank into a radial force and movement component in the thread spiral. By selectively varying the corresponding part flank angle according to the invention, additional functions such as suitability for earthquakes through expansion can be made available to the screw with little effort.

The screw is a thread-forming screw, which means that it and in particular its thread spiral are designed such that they can themselves produce their counter thread when being screwed into a cylindrical hole in the substrate. The substrate can in particular be a mineral material, preferably concrete, which means that the screw can preferably be a concrete screw. Insofar as the longitudinal direction, radial direction and/or circumferential direction are mentioned here; this can in particular refer to the longitudinal axis of the shank and/or of the screw. The directional attributes "forward" and "backward" can in particular be used consistently here such that, for example, the front region of the shank is upstream of the rear region of the shank in the same direction like the front flank of the spiral-shaped groove is upstream of the rear flank of the spiral-shaped groove. The directional attributes "forward" and "backward" can in particular refer to the longitudinal axis of the screw, which means to the screw-in direction. A thread that is, for example, flat, convex or concave can also still be located between the two flanks of the spiral-shaped groove.

The shank expediently consists of a metal material. Additionally or alternatively, the thread spiral can also consist of a metal material. The thread spiral and the shank can in particular consist of different materials which may, for example, be advantageous with regard to the load-bearing capacity and/or corrosion resistance.

The drive can, for example, have an outer polygon or an inner polygon and in particular be designed as a screw head. Since the tip of a concrete screw does not regularly have to penetrate material, the tip can preferably be formed by an end surface that is at least approximately flat. The shank can taper off at the tip but also for example taper off in a pointed manner.

The part flank angle of the front flank of the spiral-shaped groove expediently differs from the part flank angle of the rear flank of the spiral-shaped groove by at least 2° or 5°, preferably by at least 10°. A particularly wide application spectrum can be hereby enabled.

A particularly preferred configuration of the invention is the front flank of the spiral-shaped groove having a larger part flank angle, at least in regions, than the rear flank of the spiral-shaped groove. This is in particular advantageous for screws which are provided for earthquake situations. Since, in the event of an earthquake, the hole in which the screw is arranged can expand under certain circumstances which can be attributed to a tear running through the hole opening in the substrate. In this case, in the preferred configuration of the invention, the thread spiral can slide on the comparatively flat front flank and shift radially outward with radial expansion. The positive connection between thread spiral and substrate is thus maintained in spite of the tear opening such that a particularly high residual bearing capacity is maintained, in particular because the loss of bearing capacity will, in general, be negligible through the correspondingly reduced bearing surface on the shank due to the comparatively high metal pressure strengths. At the same time, the relatively steep arrangement of the rear flank ensures that pressure loads occurring when setting the screw in the shank do not cause any premature radial expansion of the thread spiral, which further improves the reliability and the load values.

The thread spiral can have two outer flanks between which a thread tip is formed. This thread tip penetrates into the substrate during setting and forms the indentation. The two outer flanks can preferably have different part flank angles whereby the functionality, in particular the setting behavior, can be further improved.

It is also expedient for the thread spiral to be inserted into the spiral-shaped groove so as to be movable along the spiral-shaped groove. A particularly effective radial expansion of the thread spiral can be hereby effected. The thread spiral can, for example, be axially fixed on the shank at the tip of the shank. A radially running retaining groove can, for example, be provided for this purpose at the tip of the shank into which a corresponding end of the thread spiral is inserted. The retaining groove can, in particular, extend transverse over the entire cross-section of the shank.

According to the invention, different thread pitches can be provided for the spiral-shaped groove and thus for the thread spiral depending on the field of use.

The invention is explained in detail below based on preferred exemplary embodiments, which are represented schematically in the enclosed Figures, and individual features of the exemplary embodiments shown below can essentially be implemented in the context of the invention individually or in any combination.

DETAILED DESCRIPTION OF THE DRAWINGS

Figure 2:
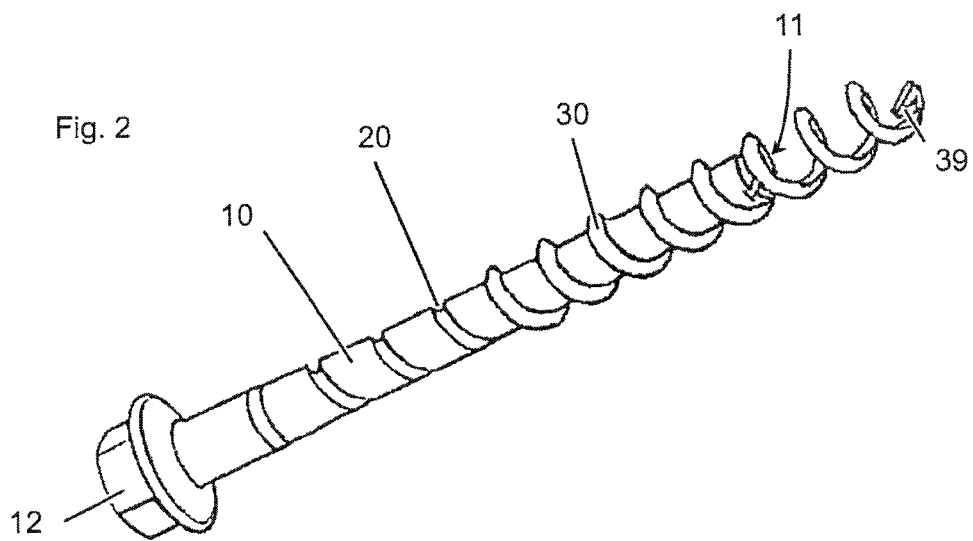
FIG. 2 is a perspective representation corresponding to FIG. 1 of the screw from FIG. 1 with partly fitted thread spiral.
Figure 3:
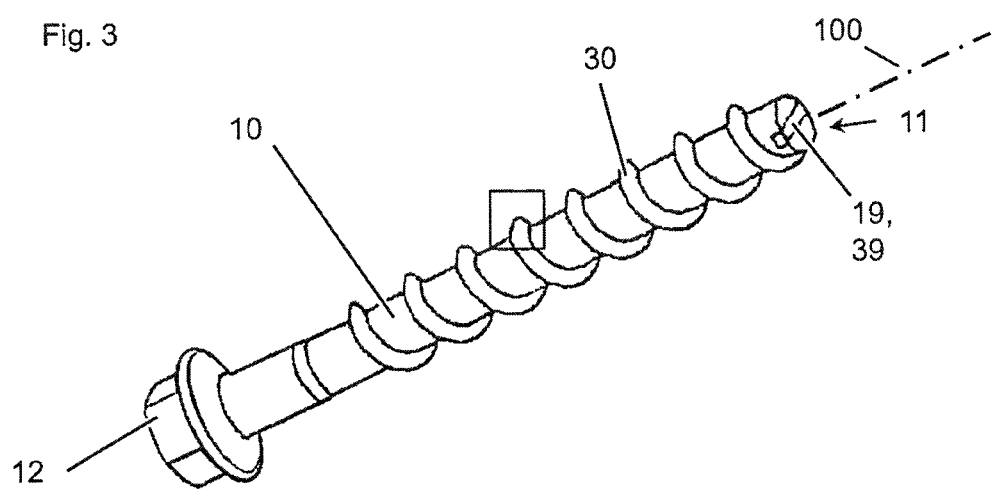
FIG. 3 is a perspective representation corresponding to FIG. 1 of the screw from FIG. 1 with thread spiral in the operationally ready state.

An exemplary embodiment of a screw according to the invention is represented in the Figures. As is shown in particular in FIGS. 1 to 3, the screw has a roughly cylindrical shank 10 at whose front end a tip 11 is provided for insertion into a bore and at whose rear-end region situated opposite the front end, a drive 12 is provided by means of which a torque can be transferred to the shank 10. The drive 12 can, for example, have an inner polygonal structure or an outer polygonal structure. In the present exemplary embodiment, the drive 12 is designed as an end screw head with an outer hexagonal structure. A spiral-shaped groove 20 is provided in the shell surface of the shank 10 which originates from the tip 11 of the shank 10.

The screw also has a thread spiral 30. This thread spiral 30 has the same pitch as the spiral-shaped groove 20 and is arranged in the spiral-shaped groove 20 in the completely fitted state of the screw (see FIG. 3). The thread spiral 30 forms a cutting thread, which cuts a counter thread when the screw is screwed into the substrate.

Figure 1:
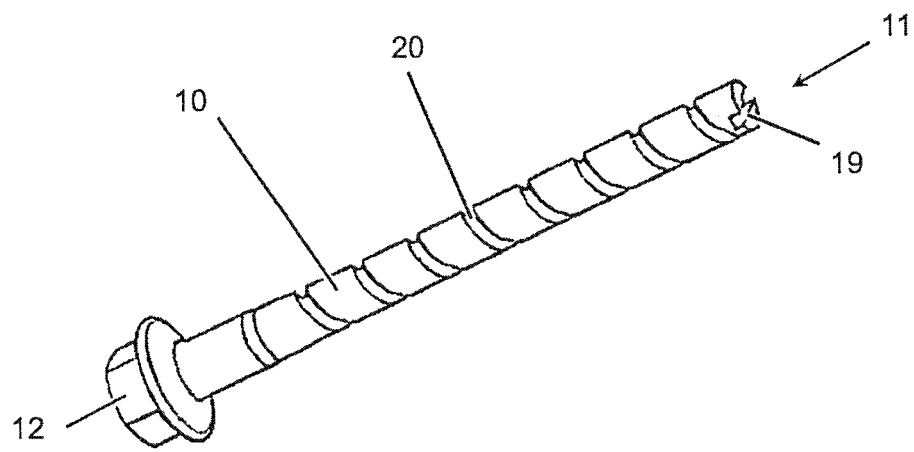
FIG. 1 is a perspective representation of the shank of a screw according to the invention without thread spiral.

As is shown in particular in FIG. 1, an end face retaining groove 19 is provided at the tip 11 of the shank 10. As is shown in particular in FIG. 2, the thread spiral 30 has an angled retaining web 39 at its front end at which the thread spiral 30 deviates from a purely helix shape. As is shown in particular in FIG. 3, the retaining web 39 is inserted into the retaining groove 19 when the screw is completely fitted. The thread spiral 30 is hereby fixed on the shank 10 at its front end axially in relation to the longitudinal axis 100 of the shank 10. Otherwise, the thread spiral 30 is arranged in the spiral-shaped groove 20 so as to be displaceable along the spiral-shaped groove 20, which means that the thread spiral 30 can shift helically forward and backward in the spiral-shaped groove 20.

Figure 4:
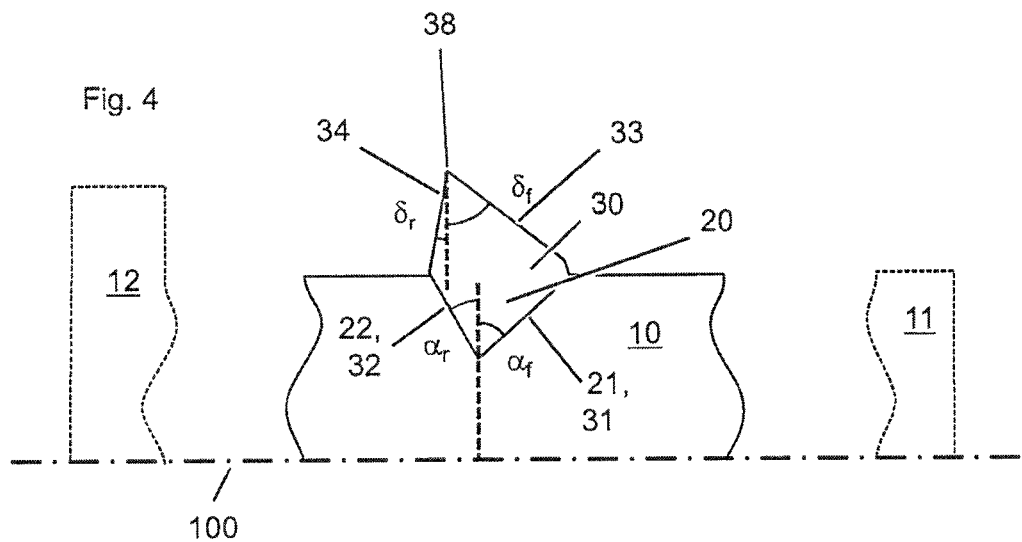
FIG. 4 is a detail view of the screw from FIG. 3 in the axial section in the region of the rectangle shown in FIG. 3, the tip and the drive of the screw also being roughly schematically represented to illustrate the directions.

As is shown in particular in FIG. 4, the spiral-shaped groove 20 has two flanks, namely a flank 21 near the tip that is at the front in the longitudinal section of the screw and facing the drive 12 and a flank 22 near the drive that is at the rear in the longitudinal section of the screw and facing the tip 11, the flank 22 being situated opposite the front flank 21. The front flank 21 has the part flank angle $\alpha_f$ and the rear flank 22 has the part flank angle $\alpha_r$. Corresponding to the invention, the two part flank angles are different from each other, which means that $\alpha_f \neq \alpha_r$. The part flank angle $\alpha_f$ of the front flank 21 is in particular greater than the part flank angle $\alpha_r$ of the rear flank 22, $\alpha_f > \alpha_r$. The two part flank angles preferably differ by at least 2°, by at least 5°, or by at least 10°, in particular $\alpha_f > \alpha_r + 2°$, $\alpha_f > \alpha_r + 5°$ or $\alpha_f > \alpha_r + 10°$. As is customary in the specialist field, the respective part flank angle can, in particular, be understood as the angle between the respective flank and a vertical to the longitudinal axis 100.

A thread base which is, for example, flat, convex or concave can also still be located in the longitudinal section between the two flanks 21 and 22 of the shank 10; the thread base is, however, not represented in the drawings.

The thread spiral 30 has two inner flanks 31 and 32 facing the spiral-shaped groove 20 and/or facing the longitudinal axis 100 of the shank 10, namely a flank 31 near the tip that is at the front in the longitudinal section of the screw and a flank 32 near the drive that is at the rear in the longitudinal section of the screw. The front flank 31 of the thread spiral 30 is adjacent the front flank 21 of the spiral-shaped groove 20 and in particular has at least approximately the same part flank angle as the front flank 21 of the spiral-shaped groove 20. The rear flank 32 of the thread spiral 30 is adjacent to the rear flank 22 of the spiral-shaped groove 20 and in particular has at least approximately the same part flank angle as the rear flank 22 of the spiral-shaped groove 20.

The thread spiral 30 also has two outer flanks 33 and 34 facing away from the spiral-shaped groove 20 and/or facing away from the longitudinal axis 100 of the shank 10, namely a flank 33 near the tip that is at the front in the longitudinal section of the screw and a flank 34 near the drive that is at the rear in the longitudinal section of the screw. The thread tip 38 of the cutting thread of the screw is formed between these two flanks 33 and 34. The front flank 33 of the thread spiral 30 has the part flank angle $\delta_f$ and the rear flank 34 has the part flank angle $\delta_r$. In the represented exemplary embodiment, these two part flank angles are different from each other, which means that $\delta_f \neq \delta_r$. The part flank angle $\delta_f$ of the front flank 33 is in particular greater than the part flank angle $\delta_r$ of the rear flank 34, $\delta_f > \delta_r$, preferably by at least 5° or 10°, $\delta_f > \delta_r + 5°$ or $\delta_f > \delta_r + 10°$.

Figure 5:
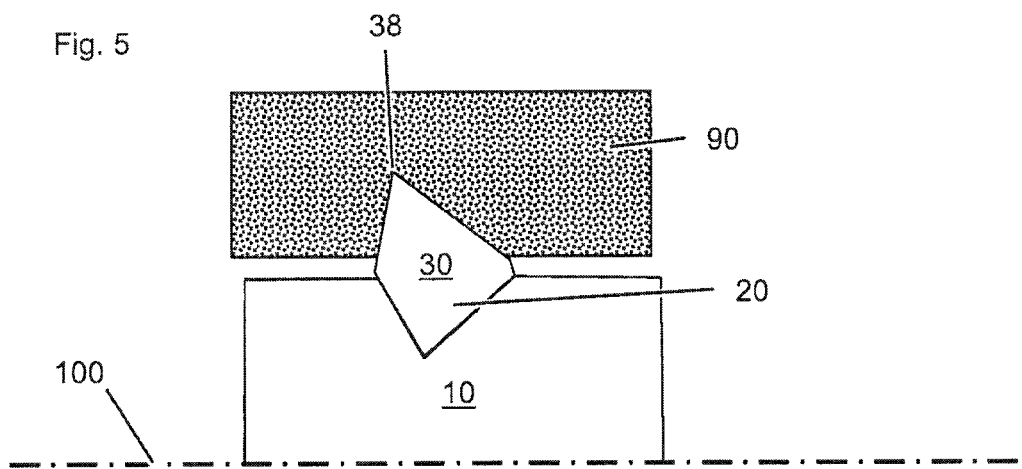
FIG. 5 is a detail view corresponding to FIG. 4 of the screw from FIG. 3, the screw being screwed into a hole in a substrate.

FIG. 5 shows a detail of the screw after it has been screwed into a hole in a substrate 90. The screw is a thread-forming screw, which means that it and in particular its counter spiral 30 are designed such that they can themselves produce their counter thread when being screwed into a cylindrical hole in the substrate 90. The substrate 90 can in particular be a mineral material, preferably concrete, which means that the screw can preferably be a concrete screw.

Figure 6:
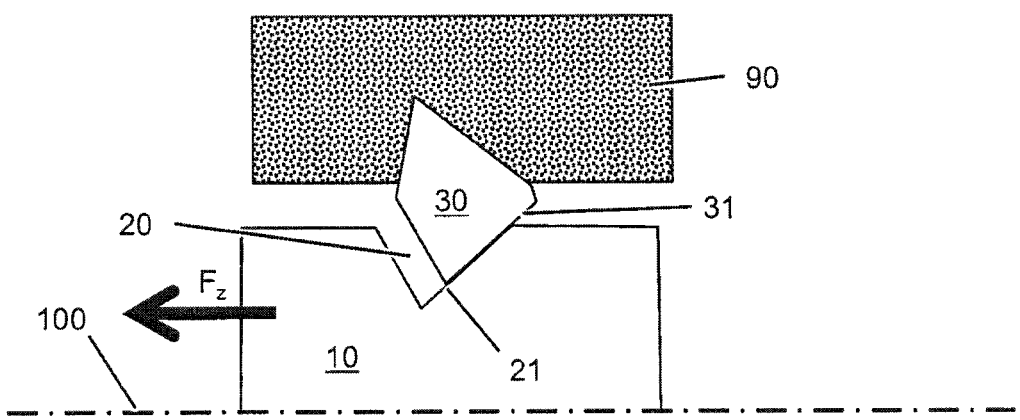
FIG. 6 is a detail view corresponding to FIG. 5, the hole wall, for example, however, being further remote from the shank of the screw than in the case of FIG. 5 due to a tear opening in the case of an earthquake.

FIG. 6 shows a detail corresponding to FIG. 5, according to FIG. 6, however, the hole wall being further remote from the shank of the screw than shown in FIG. 5. The situation of FIG. 6 can, for example, arise in the case of an earthquake when a tear running through the hole in the substrate opens and thus the hole diameter increases sectionally. Since the tensile force $F_z$ represented in FIG. 6 with an arrow acts on the shank 10 of the screw, the front flank 31 of the thread spiral 30 slides off at the front flank 21 of the spiral-shaped groove 20 in the case of a tear opening. In this case, the thread spiral 30 shifts and preferably reversibly shifts radially outward relative to the longitudinal axis 100 and remains in positive-locking engagement with the substrate 90 such that the load-bearing capacity can be largely maintained. As a result of the part flank angle $\alpha_f$ of the front flank 21 of the spiral-shaped groove 20 being selected to be greater than the part flank angle $\delta_r$ of the rear outer flank 34 of the thread spiral 30, $\alpha_f > \delta_r$, the relative displacement can be selectively shifted from the contact surface of substrate 90-thread spiral 30 to the contact surface of thread spiral 30-shank 10.

The invention claimed is:
1. A thread-forming screw, comprising:
a shank, wherein the shank has a tip in a front region of the shank for insertion into a bore in a substrate, a drive in a rear region of the shank for transmitting a torque to the shank, a spiral-shaped groove, and a thread spiral disposable in the spiral-shaped groove;
wherein the spiral-shaped groove has a front flank and a rear flank disposed opposite the front flank and wherein the front flank has a part flank angle, at least in a region, that differs from a part flank angle of the rear flank.
2. The thread-forming screw according to claim 1, wherein the part flank angle of the front flank differs from the part flank angle of the rear flank by at least 5°.
3. The thread-forming screw according to claim 1, wherein the part flank angle of the front flank is greater than the part flank angle of the rear flank.
4. The thread-forming screw according to claim 1, wherein the thread spiral has a first outer flank and a second outer flank, wherein a thread tip is formed between the first and second outer flanks, and wherein the first and second outer flanks have different part flank angles.
5. The thread-forming screw according to claim 1, wherein the thread spiral is movable along the spiral-shaped groove.
6. The thread-forming screw according to claim 1, wherein the thread spiral is axially fixed on the shank at the tip of the shank.

* * * * *